(12) United States Patent
Chen et al.

(10) Patent No.: US 9,559,791 B2
(45) Date of Patent: Jan. 31, 2017

(54) WIRELESS COMMUNICATION DEVICE FOR TRANSCEIVING HETEROGENEOUS RADIO-FREQUENCY SIGNALS

(71) Applicant: Sercomm Corporation, Taipei (TW)

(72) Inventors: Chien-Ming Chen, Taipei (TW);
Meng-Chien Chiang, Taipei (TW)

(73) Assignee: SERCOMM CORPORATION, Taipei (TW)

( * ) Notice: Subject to any disclaimer, the term of this patent is extended or adjusted under 35 U.S.C. 154(b) by 0 days.

(21) Appl. No.: 14/705,181

(22) Filed: May 6, 2015

(65) Prior Publication Data

US 2016/0112991 A1 Apr. 21, 2016

(30) Foreign Application Priority Data

Oct. 17, 2014 (CN) .......................... 2014 1 0554620

(51) Int. Cl.
*H04W 72/02* (2009.01)
*H04B 15/00* (2006.01)
(Continued)

(52) U.S. Cl.
CPC ............ *H04B 15/00* (2013.01); *H04B 1/0475* (2013.01); *H04B 1/525* (2013.01); *H04W 52/00* (2013.01);
(Continued)

(58) Field of Classification Search
CPC ......... H04W 88/06; H04W 8/26; H04B 1/006; H04B 1/406; H04B 1/005; H04M 1/725
(Continued)

(56) References Cited

U.S. PATENT DOCUMENTS 6,560,443 B1 * 5/2003 Vaisanen .................. H01Q 3/24
455/553.1
7,701,913 B2 * 4/2010 Chen ...................... H04W 92/02
370/338
(Continued)

FOREIGN PATENT DOCUMENTS

CN 101277514 A 10/2008
CN 102450086 A 5/2012

OTHER PUBLICATIONS

SIPO Office Action dated Dec. 14, 2015 in corresponding CN application (No. 201410554620.X).

*Primary Examiner* — William Nealon
(74) *Attorney, Agent, or Firm* — McClure, Qualey & Rodack, LLP

(57) ABSTRACT

A wireless communication device for transceiving heterogeneous radio-frequency (RF) signals is provided. The wireless communication device includes a first antenna, a second antenna, a first transceiver, a second transceiver and a controller. The first transceiver controls the first antenna through a first transceiving path to transceive a first RF signal according to a first wireless communication standard. The second transceiver controls the second antenna through a second transceiving path to transceive a second RF signal according to a second wireless communication standard. In a joining process when the wireless communication device establishes connection to an end device according to the second wireless communication standard, the controller reduces transmission power for transmitting the first RF signal, or reduces sensitivity for receiving the second RF signal.

3 Claims, 6 Drawing Sheets

(51) Int. Cl.
*H04B 1/04* (2006.01)
*H04B 1/525* (2015.01)
*H04W 52/00* (2009.01)
*H04W 52/38* (2009.01)
*H04W 88/06* (2009.01)
*H04W 52/42* (2009.01)

(52) U.S. Cl.
CPC ............ *H04W 52/38* (2013.01); *H04W 52/42* (2013.01); *H04W 88/06* (2013.01); *Y02B 60/50* (2013.01)

(58) Field of Classification Search
USPC ................. 455/553.1, 552.1, 550.1, 127.4
See application file for complete search history.

(56) References Cited

U.S. PATENT DOCUMENTS

| 8,594,723 | B2 | 11/2013 | Jain et al. | |
|---|---|---|---|---|
| 2001/0051530 | A1* | 12/2001 | Shiotsu | H04W 16/14 |
| | | | | 455/522 |
| 2006/0276132 | A1* | 12/2006 | Sheng-Fuh | H04B 1/48 |
| | | | | 455/41.2 |
| 2007/0224936 | A1* | 9/2007 | Desai | H04W 52/242 |
| | | | | 455/41.2 |
| 2010/0029204 | A1* | 2/2010 | Gao | H04B 1/715 |
| | | | | 455/41.2 |

\* cited by examiner

WIRELESS COMMUNICATION DEVICE FOR TRANSCEIVING HETEROGENEOUS RADIO-FREQUENCY SIGNALS

This application claims the benefit of People's Republic of China Application Serial No. 201410554620.X, filed Oct. 17, 2014, the subject matter of which is incorporated herein by reference.

BACKGROUND

Technical Field

The present disclosure relates in general to a wireless communication device, and more particularly to a wireless communication device for transceiving heterogeneous radio-frequency (RF) signals.

Description of the Related Art

Most countries have regulations and control over radio wave spectrum, and some wireless communication standards adopt the limited open spectrum bands. For example, the ZigBee standard and the WiFi standard both use industrial scientific medical (ISM) bands. As these two standards may both use the 2.4 GHz band, ZigBee signals and WiFi signals may interfere with each other.

To reduce the interference, a conventional technology adjusts operating frequencies of the ZigBee signals and WiFi signals. For example, 2.475 GHz is utilized for ZigBee signals while 2.412 GHz is utilized for WiFi signals. However, such conventional solution is far from being an optimum solution.

SUMMARY

An object of the present disclosure is to reduce the effect of WiFi signals on a ZigBee antenna in ZigBee joining process so that ZigBee connection can be successfully established.

A wireless communication device is provided according to an embodiment of the present disclosure. The wireless communication device includes a first antenna, a first transceiver, a second antenna and a second transceiver. The first antenna transceives a first radio-frequency (RF) signal according to a first wireless communication standard. The first transceiver is connected to the first antenna via a first transceiving path. The second antenna transceives a second RF signal according to a second wireless communication standard. The second transceiver connects to the second antenna via a second transceiving path. In a joining process that the wireless communication device establishes a connection with an end device according to the second wireless communication standard, the wireless communication device reduces transmission power for transmitting the first RF signal or reduces sensitivity for receiving the second RF signal.

The above and other aspects of the disclosure will become better understood with regard to the following detailed description of the embodiments. The following description is made with reference to the accompanying drawings.

DETAILED DESCRIPTION OF EMBODIMENTS

Figure 1A:
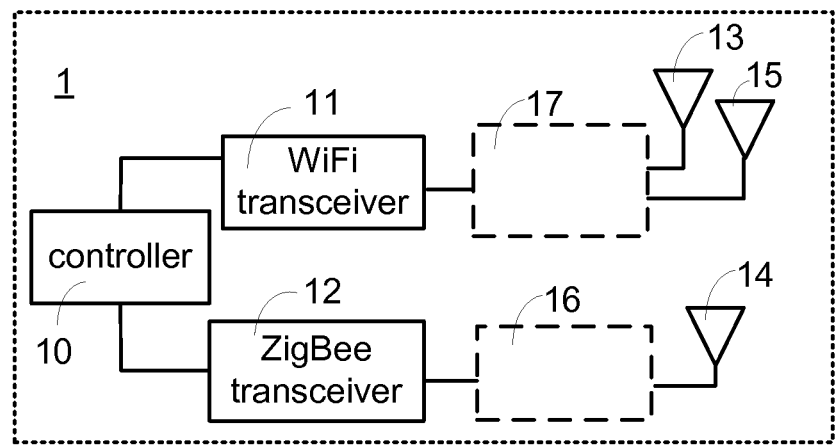
FIG. 1A is a schematic diagram of a wireless communication device simultaneously disposed with two WiFi antennas and one ZigBee antenna.

Wireless communication products integrated with a heterogeneous signal transmission function have been gradually introduced. A wireless communication device that simultaneously serves as a ZigBee coordinator and a WiFi access point (AP) is equipped with a WiFi antenna and a ZigBee antenna. According to ZigBee specifications, a joining process is performed between two ZigBee products, a ZigBee wireless communication device (router) and a ZigBee end device (sensor). After having established ZigBee connection, these two ZigBee products may exchange data according to ZigBee specifications.

To establish the ZigBee connection, the ZigBee end device and the wireless communication device jointly perform a handshake. Through the handshake, the ZigBee end device and the wireless communication device begin ZigBee joining process. Compared to ZigBee regular connection process, WiFi signals are more likely to interfere with ZigBee signals during ZigBee joining process. Once ZigBee connection is established, such connection becomes less likely to be interfered by WiFi signals. In an embodiment of the present disclosure, the wireless communication device dynamically adjusts transmission power of a WiFi antenna and/or reception sensitivity of a ZigBee antenna according to whether it is in ZigBee joining process, so as to facilitate the establishment of ZigBee connection.

It is discovered through further analysis that, WiFi signal sources that cause interference on ZigBee connection may be categorized into two types. The first type is external WiFi signals that the wireless communication device receives from other wireless communication device(s) (to be referred to as first-type WiFi interference signals). This first-type WiFi interference signals are transmitted into the wireless communication device via an open space, and are naturally attenuated through air (air loss). The second type is internal WiFi signals which are generated by the wireless communication device itself (to be referred to as second-type WiFi interference signals). The second-type WiFi interference signals, without going through too much attenuation, interfere an adjacent ZigBee transceiver within the same device.

Having undergone long-distance transmission, strength of the first-type WiFi interference signals significantly attenuates and poses weaker interference for the ZigBee transceiver. However, the second-type WiFi interference signals have a great effect on the ZigBee transceiver. When the ZigBee transceiver is interfered by the second-type WiFi interference signals, the ZigBee transceiver may fail to normally receive a request of establishing ZigBee connection from the ZigBee end device. As such, the ZigBee end device may fail to successfully establish ZigBee connection with the wireless communication device.

When a designer sets positions of a WiFi antenna and a ZigBee antenna of the wireless communication device, a physical distance between the two is kept as far as possible to minimize the effect that the second-type WiFi interference signals. Nowadays, products are developed to be light and compact, and sizes of many wireless communication products are very small (for example, 10 cm*10 cm*2 cm). Under such space restriction, arrangements and positions of the WiFi antenna and the ZigBee antenna can only reduce the interference to some extent.

According to a concept of an embodiment of the present disclosure, when the ZigBee end device and the wireless communication device enter ZigBee joining process, the wireless communication device switches a WiFi and/or ZigBee transceiving path. Switching the WiFi and/or ZigBee transceiving path reduces the effect that the second-type WiFi interference signals have on the ZigBee transceiver during the joining process. The wireless communication device adopting such switching method allows the ZigBee end device to more easily and successfully establish ZigBee connection.

FIG. 1A shows a schematic diagram of a wireless communication device equipped with two WiFi antennas and one ZigBee antenna. The wireless communication device 1 includes a controller 10, a WiFi transceiver 11, a first WiFi antenna 13, a second WiFi antenna 15, a ZigBee transceiver 12 and a ZigBee antenna 14. The WiFi transceiver 11 transceives WiFi signals through the WiFi transceiving path 17, the first WiFi antenna 13 and the second WiFi antenna 15. The ZigBee transceiver 12 transceives ZigBee signals through the ZigBee transceiving path 16 and the ZigBee antenna 14. The controller 10 selects and configures the WiFi transceiver 11 and/or the ZigBee transceiver 12. Through general purpose input/output (GPIO) pins, the controller 10 may further control configuration of the WiFi transceiving path 17 and the ZigBee transceiving path 16.

According to WiFi specifications, the wireless communication device 1 may transceive WiFi signals jointly through the first WiFi antenna 13 and the second WiFi antenna 15 at the same time. Alternatively, the wireless communication device 1 may independently utilize the first WiFi antenna 13 to transceive WiFi signals.

Figure 1B:
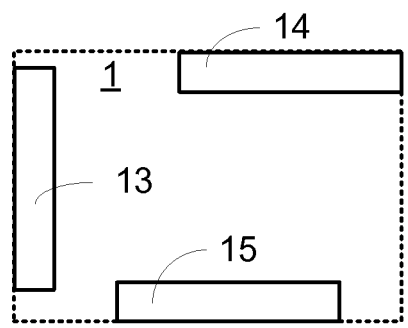
FIG. 1B is a schematic diagram of a wireless communication device internally arranged with two WiFi antennas and one ZigBee antenna.

FIG. 1B shows a schematic diagram of a wireless communication device equipped with two WiFi antennas and one ZigBee antenna. The first WiFi antenna 13 is disposed orthogonally to the ZigBee antenna 14. For example, using the same model of antennas as the first WiFi antenna 13 and the ZigBee antenna 14, the first WiFi antenna 13 is disposed along a vertical direction and the ZigBee antenna 14 is disposed at a horizontal direction. Such orthogonal arrangement of the first WiFi antenna 13 and the ZigBee antenna 14 renders good antenna isolation, so as to reduce the interference that the first WiFi antenna 13 causes on the ZigBee antenna 14.

On the other hand, the second WiFi antenna 15 is disposed in a direction different from that of the first WiFi antenna 13. The WiFi signals transmitted by the second WiFi antenna 15 may interfere with the ZigBee signals received by the ZigBee antenna 14. The controller 10 may switch the WiFi transceiving path 17 according to the concept of the present disclosure, reducing such interference.

Figure 2A:
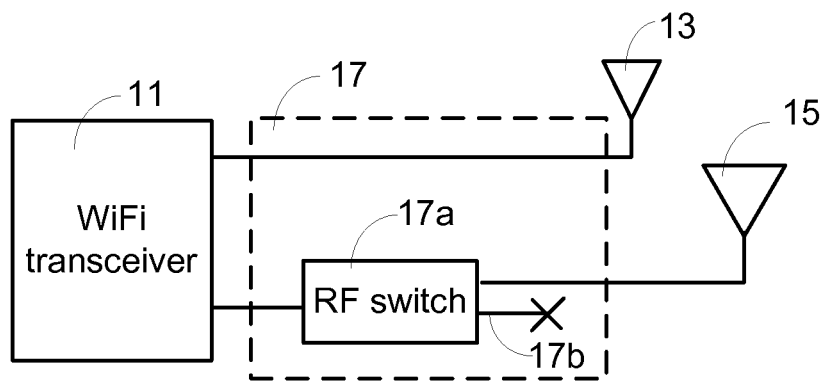
FIGS. 2A and 2B are schematic diagrams of a WiFi transceiving path according to a first embodiment of the present disclosure.
Figure 2B:
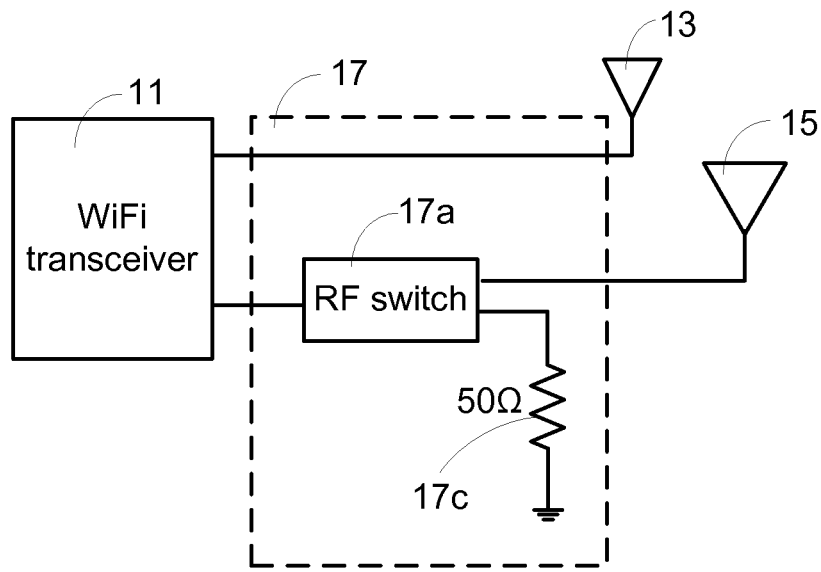

FIGS. 2A and 2B show schematic diagrams of a WiFi transceiving path according to a first embodiment of the present disclosure. The WiFi transceiving path 17 is between the WiFi transceiver 11 and the first WiFi antenna 13 and the second WiFi antenna 15. In the embodiment, the WiFi transceiver 11 is directly connected to the first WiFi antenna 13. On the other hand, the WiFi transceiver 11 connects to a radio-frequency (RF) switch 17a, and the RF switch 17a further connects to the second WiFi antenna 15 and a dummy load (no effective signal is transmitted wirelessly). The dummy load can be achieved by an open circuit 17b or a 50 ohm terminal 17c.

The RF switch 17a connects with the GPIO of the controller 10, which outputs different commands through the GPIO according to whether the wireless communication device 1 is in ZigBee joining process. The RF switch 17a then switches accordingly. In the present disclosure, the configuration that the controller 10 adopts in the joining process is referred to as transient configuration, and the configuration that the controller 10 adopts other than the joining process (for example, a ZigBee regular connection process) is referred to as steady state configuration.

In the embodiment in FIGS. 2A and 2B, when the controller 10 adopts the transient configuration, the RF switch 17a connects the WiFi transceiver 11 to the open circuit 17b or the 50 ohm terminal 17c. At this point, the wireless communication device 1 performs transmission with other WiFi devices through the first WiFi antenna 13. When the controller 10 adopts the steady state configuration, the RF switch 17a conducts the WiFi transceiver 11 to the second WiFi antenna 15; the wireless communication device 1 simultaneously utilizes the first WiFi antenna 13 and the second WiFi antenna 15 to transmit WiFi signals. For example, when a path of the first WiFi antenna 13 and a path of the second WiFi antenna 15 respectively transmit 15 dBm, a total power of the two WiFi antennas is 18 dBm. In the transient configuration, the transceiver 11 only transmits WiFi signals through the first WiFi antenna 13, and the total power is 15 dBm, which is 3 dBm less than the total power in the steady state configuration. As such, the interference that the WiFi signals causes on the ZigBee signals is reduced. Consequently, the probability of successfully establishing a connection between the ZigBee end device and the wireless communication device 1 increases.

Since the first WiFi antenna 13 and the ZigBee antenna 14 are antennas of the same model, an orthogonal arrangement provides better isolation such that the WiFi signals transmitted by the first WiFi antenna 13 cause less interference on the ZigBee antenna 14. On the other hand, as the second WiFi antenna 15 does not transmit WiFi signals in ZigBee joining process, the second WiFi antenna 15 will not affect the reception of ZigBee signals. Therefore, the wireless communication device 1 of the present disclosure is less affected by the second-type WiFi interference signals in ZigBee joining process. After completing ZigBee joining process, the second-type WiFi interference signals is unlikely to disconnect the ZigBee connection.

Figure 3:
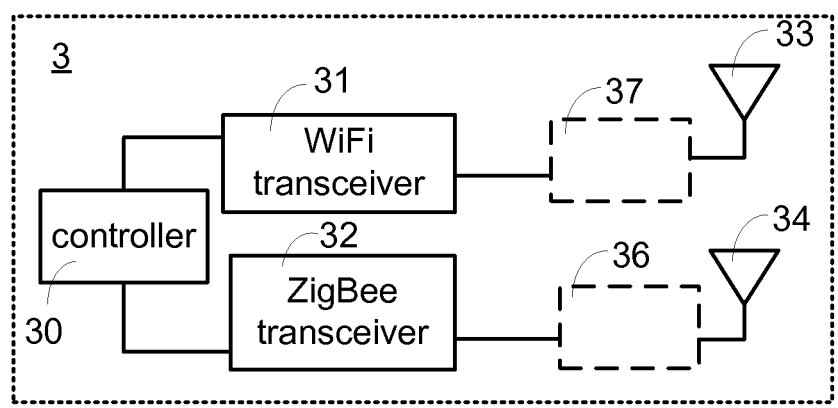
FIG. 3 is a schematic diagram of a wireless communication device simultaneously disposed with one WiFi antenna and one ZigBee antenna.

FIG. 3 shows a schematic diagram of a wireless communication device equipped with one WiFi antenna and one ZigBee antenna. In FIG. 3, the wireless communication device 3 includes a controller 30, a WiFi transceiver 31, a WiFi antenna 33, a ZigBee transceiver 32 and a ZigBee antenna 34. The WiFi transceiver 31 transceives WiFi signals through a WiFi transceiving path 37 and the WiFi antenna 33. The ZigBee transceiver transceive ZigBee signals through a ZigBee transceiving path 36 and the ZigBee antenna 34. The controller 30 selects and configures the WiFi transceiver 31 and/or the ZigBee transceiver 32. The controller 30 may further configure the conduction of the WiFi transceiving path 37 and the ZigBee transceiving path 36.

As previously stated, according to the WiFi specifications, a wireless communication device may independently utilize one WiFi antenna or simultaneously utilize two WiFi antennas to transmit WiFi signals. An embodiment below associated with switching a WiFi transceiving path is applicable to the first WiFi antenna 13 and the second WiFi antenna 15 in FIG. 1, or the WiFi antenna 33 in FIG. 3. For illustration purposes, the WiFi antenna 33 in FIG. 3 is used as an example below.

Figure 4A:
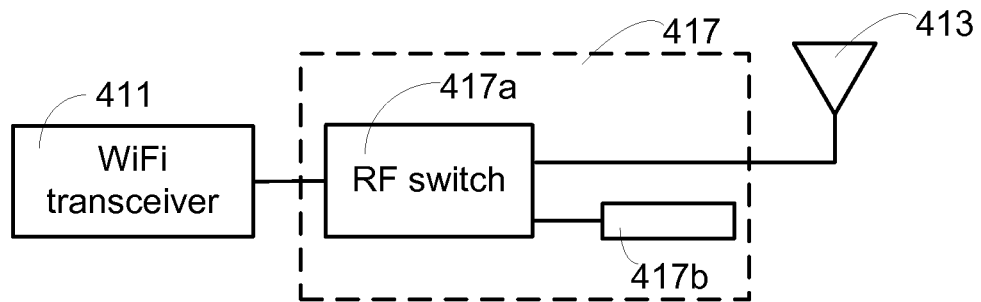
FIG. 4A is a schematic diagram of a WiFi transceiving path adopting a chip antenna in transient configuration.
Figure 4B:
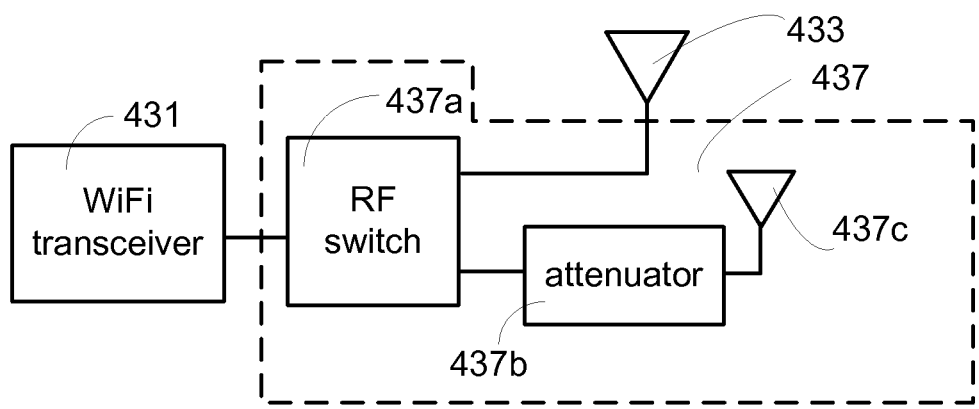
FIG. 4B is a schematic diagram of a WiFi transceiving path adopting an attenuator collaborating with a WiFi antenna in transient configuration.

FIGS. 4A and 4B depict an embodiment in which a WiFi transceiving path adopts an RF switch collaborating with two sub-antennas. In the embodiment, the WiFi transceiving path is internally equipped with an RF switch, and the WiFi antenna is further divided into two sub-antennas. Through controlling the RF switch, the controller selects one of the sub-antennas that is actually utilized for transceiving WiFi signals. According to a concept of the present disclosure, the sub-antenna having a lower transmission power (for example, 12 dBm) is utilized during ZigBee joining process, and the sub-antenna having a higher transmission power (for example, 15 dBm) is utilized after ZigBee joining process.

FIG. 4A shows a schematic diagram of a WiFi transceiving path. In the embodiment, two different antenna models are adopted as WiFi sub-antennas. The first sub-antenna 413 transceives WiFi signals at better efficiency and gain, and the second sub-antenna 417b transceives WiFi signals at inferior efficiency and gain. For example, the second sub-antenna 417b may be a chip antenna.

A WiFi transceiver 411 is electrically connected to the first sub-antenna 413 and the second sub-antenna 417b through an RF switch 417a. The controller further controls the RF switch 417a through its GPIO to either conduct the WiFi transceiver 411 to the first sub-antenna 413 or the second sub-antenna 417b. During ZigBee joining process, the RF switch 417a conducts the WiFi transceiver 411 to the second sub-antenna 417b. In the embodiment, the conduction between the RF switch 417a and the second sub-antenna 417b is defined as transient configuration of the WiFi transceiving path 417. The radiation efficiency of the second sub-antenna 417b is lower and less likely to interfere with the reception of the ZigBee signals of the ZigBee antenna. In periods after ZigBee joining process, the controller adopts the steady state configuration, and the RF switch 417a conducts the WiFi transceiver 411 to the first sub-antenna 413.

FIG. 4B shows a schematic diagram of a WiFi transceiving path. In the embodiment, antennas of the same model or different models may be utilized as WiFi sub-antennas. During ZigBee joining process, the controller adopts the transient configuration to configure the WiFi transceiving path, such that an RF switch 437a conducts the WiFi transceiver 431 to a second sub-antenna 437c via an attenuator 437b. In the transient configuration, the attenuator 437b attenuates the transmission power of the WiFi signals before transmitting the WiFi signals via the second sub-antenna 437c. In periods other than ZigBee joining process, the controller adopts the steady state configuration to configure the WiFi transceiving path 437, such that the RF switch 437a directly conducts the WiFi transceiver 431 to a first sub-antenna 433.

Figure 4C:
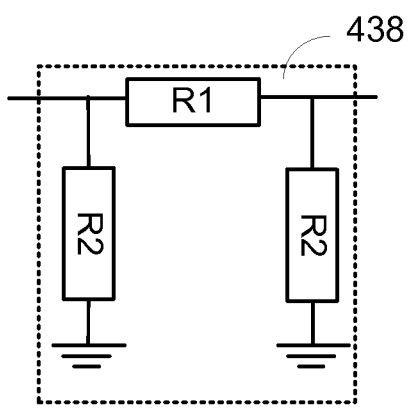
FIG. 4C is a schematic diagram of a π-type attenuator utilized as an attenuator.
Figure 4D:
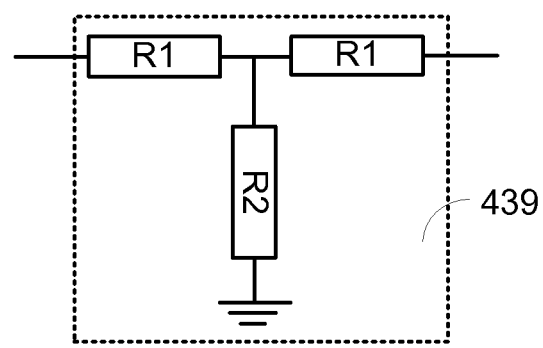
FIG. 4D is a schematic diagram of a T-type attenuator utilized as an attenuator.

For example, the attenuator 437b may be a n-type attenuator 438 as shown in FIG. 4C. The n-type attenuator 438 is formed by one first resistor R1 and two second resistors R2. For another example, the attenuator 437b may be a T-type attenuator 439 as shown in FIG. 4D. The T-type attenuator 439 is formed by two first resistors R1 and one second resistor R2. After passing through the attenuator 437b, the WiFi signals transmitted by the second sub-antenna 437c have a lower power. Thus, the WiFi signals transmitted by the second sub-antenna 437c are less likely to interfere with the ZigBee antenna.

Figure 4E:
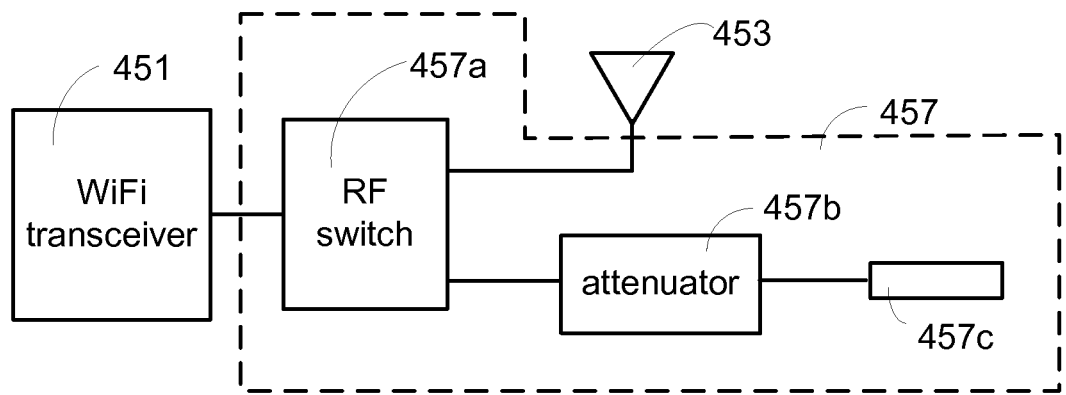
FIG. 4E is a schematic diagram of a WiFi transceiving path adopting a chip antenna collaborating with an attenuator in transient configuration.

FIG. 4E shows a schematic diagram of a WiFi transceiving path. FIG. 4E is equivalently a combination of the methods in FIGS. 4A and 4B. That is, a chip antenna (for example, a second sub-antenna 457c) having a lower power is adopted, and power for transmitting WiFi signals is attenuated by an attenuator 457b. During ZigBee joining process, the controller adopts the transient configuration to control a WiFi transceiving path 457, such that an RF switch 457a conducts a WiFi transceiver 451 to a second sub-antenna 457c through an attenuator 457b. During ZigBee connection process, the controller adopts the steady state configuration to control the WiFi transceiving path 457, such that the RF switch 457a conducts the WiFi transceiver 451 to a first sub-antenna 453.

Figure 5:
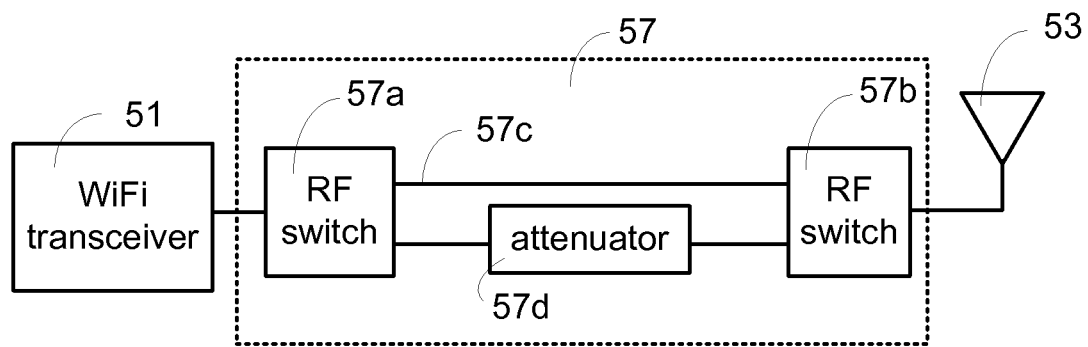
FIG. 5 is a schematic diagram of a WiFi transceiving path according to another embodiment.

FIG. 5 shows a schematic diagram of a WiFi transceiving path according to another embodiment. In the embodiment, a WiFi transceiving path 57 includes two RF switches 57a and 57b. Further, the RF switches 57a and 57b may be connected by two connections, via a direct connection 57c and an attenuator 57d. Along with the change of ZigBee connection, the controller controls the WiFi transceiving path through the GPIO to further determine the connection of the RF switches 57a and 57b. During ZigBee joining process, the controller adopts the transient configuration, such that the WiFi transceiver 51 transmits the WiFi signals to a WiFi antenna 53 through the RF switch 57a, the attenuator 57d and the RF switch 57b. With the usage of the attenuator 57d, the transmission power of the WiFi signals is lower and less likely interferes ZigBee signals. During periods in which no ZigBee joining process is ongoing, the controller switches to the steady state configuration, such that the WiFi transceiver 51 conducts the WiFi signals to the WiFi antenna 53 through the RF switch 57a, the direct connection 57c and the RF switch 57b.

Figure 6:
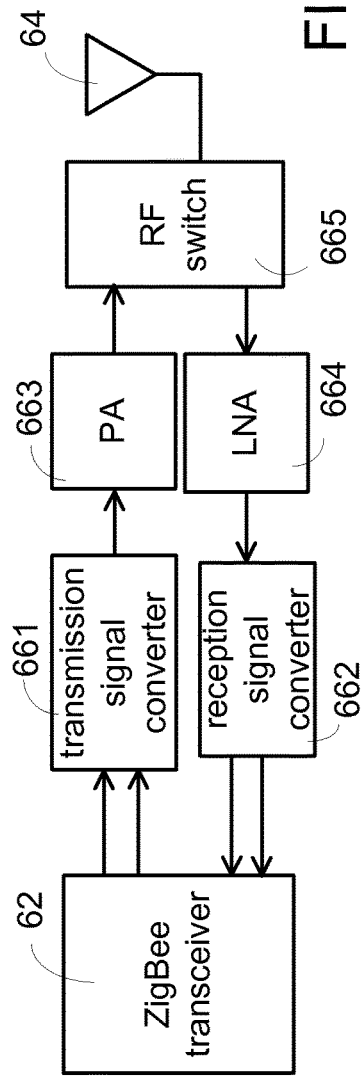
FIG. 6 is a schematic diagram of transceiving a ZigBee signal via a ZigBee antenna.

In the foregoing embodiments, the WiFi transceiving path is switched. In another embodiment of the present disclosure, the ZigBee transceiving path is switched. FIG. 6 shows a schematic diagram of transceiving signals of a ZigBee transceiver 62 through a ZigBee antenna 64. In the diagram, the arrows on the top represent a transmission path of ZigBee signals, and the arrows at the bottom represent a reception path of ZigBee signals. The transmission path of ZigBee signals includes a transmission signal converter 661, a power amplifier (PA) 663 and an RF switch 665. The reception path of ZigBee signals includes a reception signal converter 662, a low noise amplifier (LNA) 664 and the RF switch 665. The PA 663 amplifies the ZigBee transmission signals, the LNA 664 amplifies ZigBee reception signals, and the RF switch 665 switches the transmission path or the reception path.

Figure 7:
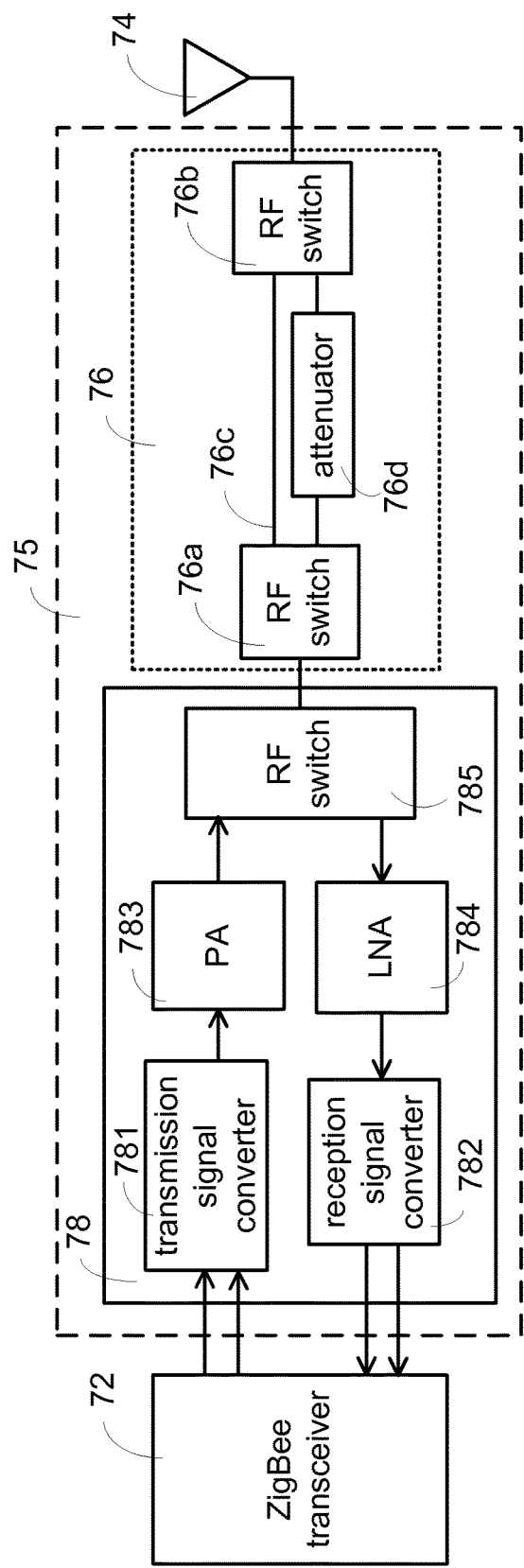
FIG. 7 is a schematic diagram of a ZigBee antenna according to an embodiment.

FIG. 7 shows a schematic diagram of a ZigBee transceiving path according to an embodiment. In the embodiment, the ZigBee transceiving path 75 includes an RF front-end chip 78 and a switching module 76. The RF front-end chip 78 is internally integrated with a PA 783, an LNA 784 and an RF switch 785. The RF front-end chip 78 may further include a transmission signal converter 781 and a reception signal converter 782. A ZigBee transceiver 72 connects to the RF front-end chip 78, and the RF front-end chip 78 connects to a ZigBee antenna 74 through the switching module 76. The switching module 76 includes RF switches 76a and 76b, a direct connection 76c and an attenuator 76d.

When the ZigBee transceiver 72 transmits ZigBee signals, the switching module 76 keeps ZigBee signals to be transmitted through the direct connection 76c between the RF switches 76a and 76b. The switching module 76 does not proactively attenuate the ZigBee signals transmitted from the wireless communication device. On the other hand, when the ZigBee transceiver 72 receives ZigBee signals, the controller provides the switching module 76 with two configurations, that is, a steady state configuration used in ZigBee regular connection process and a transient configuration used in ZigBee joining process.

When the steady state configuration is adopted, the ZigBee antenna 74 transmits the ZigBee signals to the RF front-end chip 78 through the RF switch 76b, the direct connection 76c and the RF switch 76a. At this point, the reception sensitivity of the ZigBee transceiver 72 keeps normal. When the ZigBee reception sensitivity is good, the ZigBee transceiver 72 may also receive WiFi interference signals, resulting in ZigBee connection failure. For example, WiFi interference easily incurs when Zigbee reception sensitivity is −100 dBm; and WiFi interference can be reduced when Zigbee reception sensitivity is −95 dBm.

When the transient configuration is adopted, the attenuator 76d attenuates the ZigBee signals transmitted between the RF switches 76a and 76b, such that the reception sensitivity of the ZigBee transceiver 72 has weakened. For example, the Zigbee reception sensitivity has changed from −100 dBm to −95 dBm.

During ZigBee joining process, the wireless communication device is less likely to receive transmission interference from the WiFi transceiver because the reception sensitivity is reduced. Therefore, by applying the attenuator 76d on the ZigBee transceiving path 75, the probability of successfully establishing a connection between the ZigBee end device and the wireless communication device can increase.

Figure 8:
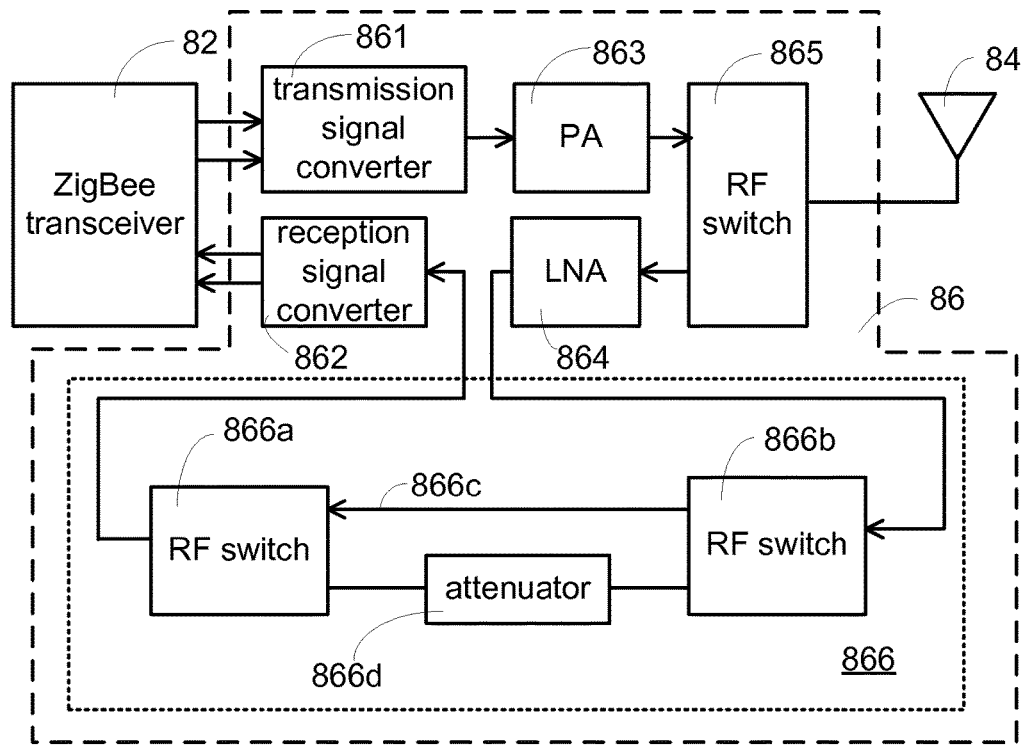
FIG. 8 is a schematic diagram of switching a ZigBee transceiving path according to another embodiment.

FIG. 8 shows a schematic diagram of switching a ZigBee transceiving path according to another embodiment of the present disclosure. A ZigBee transceiver 82 transmits ZigBee signals through a transmission signal converter 861, a PA 863, an RF switch 865 and a ZigBee antenna 84. On the other hand, the ZigBee transceiver 82 receives the ZigBee signals from the ZigBee end device through the ZigBee antenna 84, an LNA 864, a switching module 866 and a reception signal converter 862.

In the embodiment, the transmission power that the wireless communication device transmits ZigBee signals through the ZigBee antenna 84 may remain consistent regardless whether the wireless communication device and the ZigBee end device are in ZigBee joining process or ZigBee regular connection process. On the other hand, depending on ZigBee joining process or ZigBee regular connection process, the controller controls the switching module 866 on the ZigBee transceiving path 86 through a GIOP when the wireless communication device receives the ZigBee signals. The switching module 866 includes RF switches 866a and 866b, a direct connection 866c and an attenuator 866d. In ZigBee joining process, the attenuator 866d attenuates the ZigBee signals received by the ZigBee antenna 84. Therefore, in ZigBee joining process, the ZigBee antenna 84 receives the ZigBee signals at a relatively lower sensitivity. After completing ZigBee joining process, the ZigBee connection is unlikely to be disconnected by the second-type WiFi interference signals. After completing the joining process, the RF switches 866a and 866b are conducted through the direct connection 866c to maintain the original reception sensitivity of the ZigBee antenna 84.

Figure 9:
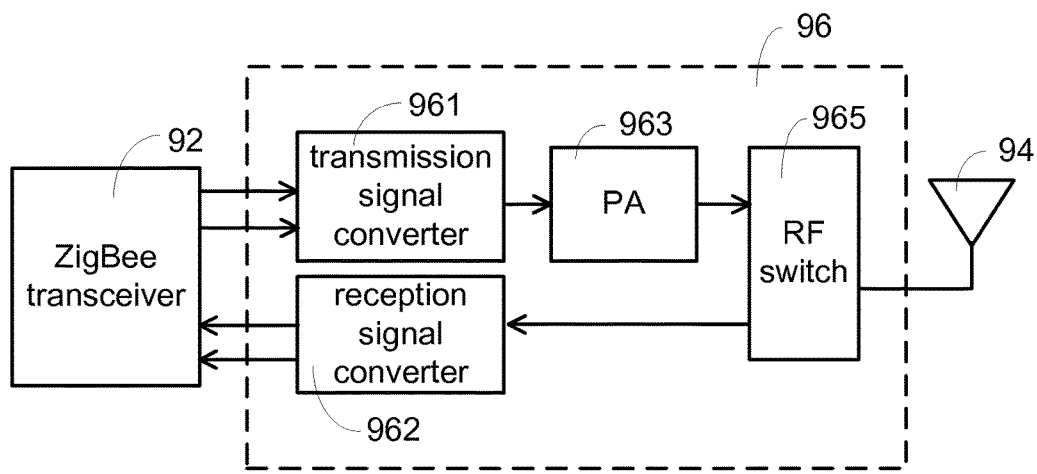
FIG. 9 is a schematic diagram of a ZigBee antenna according to yet another embodiment.

FIG. 9 shows a schematic diagram of switching a ZigBee antenna according to another embodiment. For an application where a distance between a WiFi antenna and a ZigBee antenna is too close (for example, shorter than 12 cm), a ZigBee transceiving path 96 may adopt an asymmetrical architecture for a ZigBee transmission path and a ZigBee reception path. That is, the ZigBee transmission path includes a PA 963, whereas the ZigBee reception path does not include an LNA.

A ZigBee transceiver 92 transmits the ZigBee signals through a transmission signal converter 961, a PA 963, an RF switch 965 and a ZigBee antenna 94. On the other hand, the ZigBee signals from a ZigBee end device are transmitted to the ZigBee transceiver 92 through the ZigBee antenna 94, the RF switch 965 and a reception signal converter 962. When such architecture is adopted, the reception sensitivity is lower than the architecture that includes a low noise amplifier, such that the probability of successfully establishing ZigBee connection can increase.

In the foregoing embodiments, details of reducing the transmission power for WiFi signals and reducing the reception sensitivity for ZigBee signals in ZigBee joining process are respectively described. In practice, the wireless communication device may also simultaneously control the WiFi transceiving path and the ZigBee transceiving path in ZigBee joining process.

Even if the WiFi transmission power and/or the ZigBee reception sensitivity are/is reduced in ZigBee joining process (about 1 to 2 minutes), the wireless communication device may still normally transmit and receive WiFi signals, and simultaneously successfully establish ZigBee connection. After ZigBee joining process, the ZigBee connection is unlikely to be disconnected by the second-type WiFi interference signals. At this point, the original reception sensitivity of the ZigBee reception path is restored and/or the WiFi transmission power is restored through the WiFi path.

While the disclosure has been described by way of example and in terms of the embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless communication device, comprising:
   a first antenna, for transceiving a first radio-frequency (RF) signal according to a first wireless communication standard;
   a first transceiver, connected to the first antenna through a first transceiving path;

a second antenna, for transceiving a second RF signal according to a second wireless communication standard; and a second transceiver, connected to the second antenna through a second transceiving path, wherein the second transceiving path comprises:

a reception path, electrically connected to the second transceiver and the second antenna, comprising:

a first RF switch;

a second RF switch, electrically connected to the first RF switch; and an attenuator, electrically connected to the first RF switch and the second RF switch, wherein the wireless communication device reduces sensitivity for receiving the second RF signal in a joining process when establishing a connection to an end device according to the second wireless communication standard, wherein, in the joining process, the first RF switch conducts to the second RF switch through the attenuator; and in a period other than the joining process, the first RF switch conducts to the second RF switch directly.

2. A wireless communication device, comprising:

a first antenna, for transceiving a first RF signal according to a first wireless communication standard;

a first transceiver, connected to the first antenna through a first transceiving path;

a second antenna, for transceiving a second RF signal according to a second wireless communication standard; and a second transceiver, connected to the second antenna through a second transceiving path, wherein the wireless communication device reduces transmission power for transmitting the first RF signal or reduces sensitivity for receiving the second RF signal in a joining process when establishing a connection to an end device according to the second wireless communication standard;

wherein the first transceiving path comprises:

a third antenna, for transceiving the first RF signal according to the first wireless communication standard; and a RF switch, electrically connected to the third antenna and the first transceiver; wherein in the joining process, the RF switch disconnects the third antenna from the first transceiver, and the first transceiver transmits the RF signal through the first antenna;

in a period other than the joining process, the RF switch conducts the third antenna to the first transceiver, and the first transceiver transmits the first RF signal jointly through the first antenna and the third antenna.

3. A wireless communication device, comprising:

a first antenna, for transceiving a first RF signal according to a first wireless communication standard;

a first transceiver, connected to the first antenna through a first transceiving path;

a second antenna, for transceiving a second RF signal according to a second wireless communication standard; and a second transceiver, connected to the second antenna through a second transceiving path, wherein the wireless communication device reduces transmission power for transmitting the first RF signal or reduces sensitivity for receiving the second RF signal in a joining process when establishing a connection to an end device according to the second wireless communication standard;

wherein the first antenna comprises a first sub-antenna and a second sub-antenna, transmission power of the first sub-antenna is greater than transmission power of the second sub-antenna, and the first transceiving path comprises:

a RF switch, electrically connected to the first transceiver, the first sub-antenna and the second sub-antenna, wherein in the joining process, the RF switch conducts the first transceiver to the second sub-antenna; and in a period other than the joining process, the RF switch conducts the first transceiver to the first sub-antenna.

* * * * *